(12) United States Patent
Wang et al.

(10) Patent No.: US 8,801,392 B2
(45) Date of Patent: Aug. 12, 2014

(54) CONTROLLING MECHANISM FOR ACTIVATION OF AN AIR PUMP TO BE IMPLEMENTED IN AN INFLATABLE OBJECT

(75) Inventors: Cheng-Chung Wang, Taipei (TW); Chien-Hua Wang, Taipei (TW)

(73) Assignee: Team Worldwide Corporation, Taipei (TW)

( * ) Notice: Subject to any disclaimer, the term of this patent is extended or adjusted under 35 U.S.C. 154(b) by 538 days.

(21) Appl. No.: 12/838,251

(22) Filed: Jul. 16, 2010

(65) Prior Publication Data
US 2011/0011465 A1    Jan. 20, 2011

(30) Foreign Application Priority Data
Jul. 17, 2009  (CN) .......................... 2009 1 0041226

(51) Int. Cl.
A47C 27/08    (2006.01)
F04B 39/10    (2006.01)
F04B 49/06    (2006.01)

(52) U.S. Cl.
USPC .............................. 417/44.9; 417/44.2; 5/713

(58) Field of Classification Search
USPC ..................... 417/44.2, 44.9; 5/713
See application file for complete search history.

(56) References Cited

U.S. PATENT DOCUMENTS

| | | | |
|---|---|---|---|
| 4,829,616 A * | 5/1989 | Walker | 5/713 |
| 2008/0201857 A1 * | 8/2008 | Kelly | 5/713 |
| 2010/0278659 A1 | 11/2010 | Wang et al. | |
| 2011/0284108 A1 | 11/2011 | Wang et al. | |

* cited by examiner

*Primary Examiner* — Charles Freay
*Assistant Examiner* — Philip Stimpert

(57) ABSTRACT

A controlling mechanism for an inflatable object has a valve controlling assembly for opening/closing operation of the valve, a pressure controlling assembly for sensing pressure difference to selectively activate operation of the valve and a linkage assembly interactively arranged between the valve controlling assembly and the pressure controlling assembly to sense operation of the pressure controlling assembly and consequently operate movement of the valve controlling assembly.

24 Claims, 7 Drawing Sheets

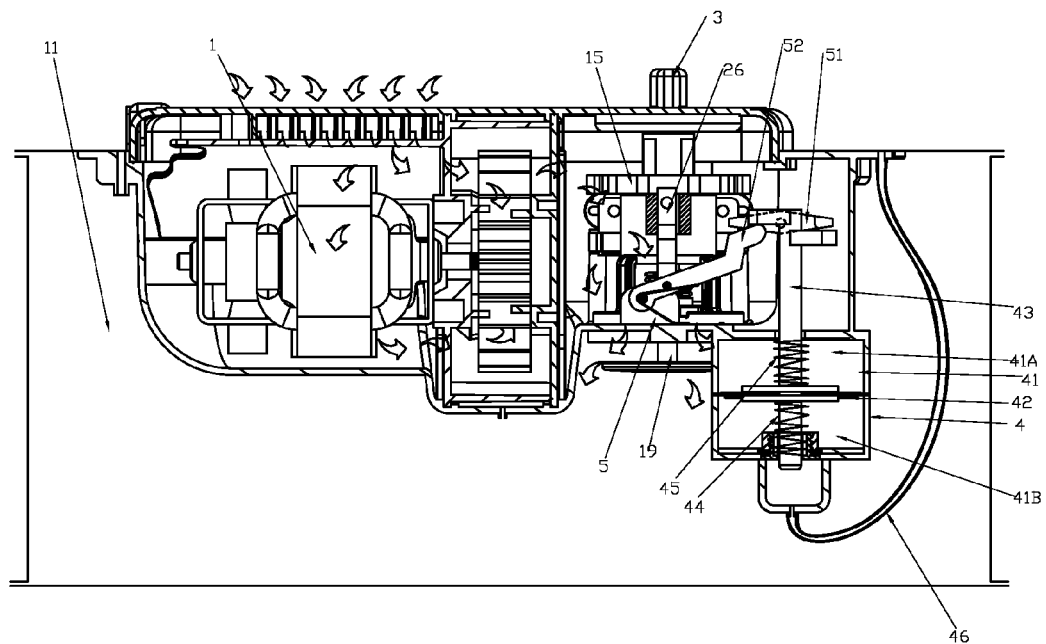
Fig. 4
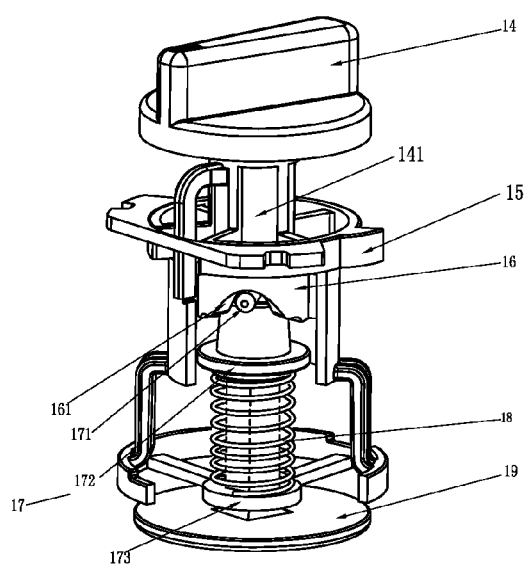 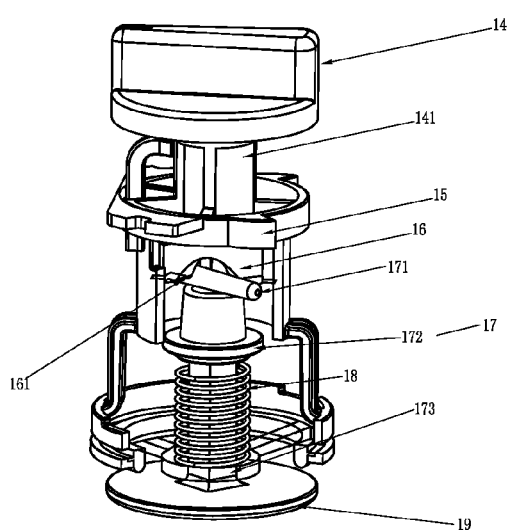
Fig. 4A          Fig. 4B

CONTROLLING MECHANISM FOR ACTIVATION OF AN AIR PUMP TO BE IMPLEMENTED IN AN INFLATABLE OBJECT

BACKGROUND OF THE INVENTION

1. Field of the Invention

The present invention relates to a controlling mechanism for activation of an air pump which is implemented in an inflatable object, with which the air pump operation can be automatically activated/deactivated without the help of any remote or manual control.

2. Description of the Prior Art

Following the advance of modern technology, electronic devices are becoming handier to our daily lives. Almost everywhere and anytime, we unavoidably would encounter some kind of electronic devices to achieve the desired goals. Handy as they are, they somehow cause other different disabilities to our lives though. That is, they tend to break easily and when they do, we have to put up all the discomforts that come along.

Furthermore, as raw material price goes up in recent years, manufacturers considering the easily broken electronic devices tend to use less modulated assemblies and more robust mechanical elements interactively connected with one another to achieve the greatest goal, to produce the most robust and longstanding merchandises.

SUMMARY OF THE INVENTION

The primary objective of the present invention is to provide a controlling mechanism for operation of an air pump that is used in an inflatable object. The controlling mechanism includes a valve controlling assembly responsible for open/close operation of a valve, a pressure controlling assembly responsible for sensing pressure difference to selectively activate the operation of the valve and a linkage assembly interactively sandwiched between the valve controlling assembly and the pressure controlling assembly to sense the operation of the pressure controlling assembly and consequently operate the movement of the valve controlling assembly.

In a preferred embodiment of the present invention, another objective of the present invention is that the actuation of the air blower is controllable by the valve controlling assembly, the pressure controlling assembly or the linkage.

In a preferred embodiment of the present invention, another objective of the present invention is that the pressure controlling assembly is actuated by resilience force, atmospheric/inflatable object pressure or the combination thereof.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic cross sectional view showing a controlling mechanism of a different embodiment of the present invention used in an inflatable object;

FIG. 4A is a perspective view showing a different valve controlling assembly for controlling operation of the valve of the inflatable object;

FIG. 4B is a perspective view showing that the valve controlling assembly shown in FIG. 4A is rotated to force the valve open;

DETAILED DESCRIPTION

Figure 1A:
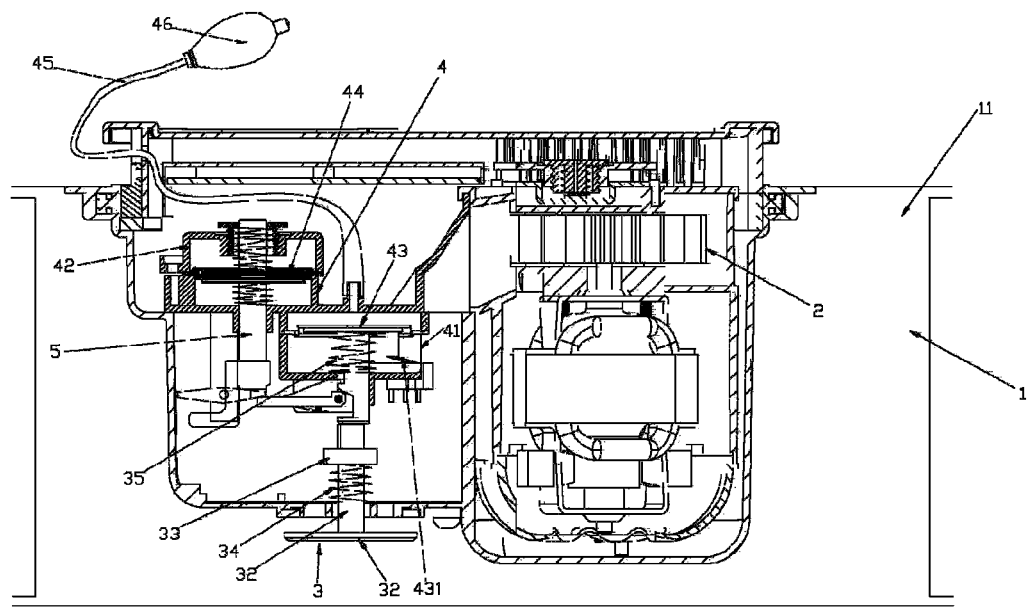
FIG. 1A is a cross sectional view of a controlling mechanism of a preferred embodiment of the present invention.
Figure 1B:
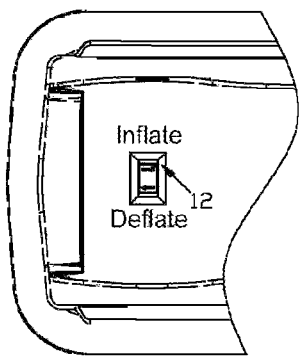
FIG. 1B is a top view showing a switch mounted on top of an inflatable object.

With reference to FIGS. 1A and 1B, a schematic side view shows a preferred embodiment of the controlling mechanism of the present invention is used in an inflatable object 1 having therein a housing 11. Within the housing 11, an air blower assembly 2 is fixedly installed to be responsible for inflation/deflation of the housing 11 and on an outer surface thereof, a switch 12 is mounted to select rotation direction of the fan to choose direction of the airflow drawn by the air blower assembly 2. As the function of the air blower assembly 2 inside the housing 11 is conventional in the art, detailed description thereof is thus omitted.

It is also noted that the controlling mechanism in a preferred embodiment of the present invention includes a valve controlling assembly 3 responsible for open/close operation of a valve, a pressure controlling assembly 4 responsible for sensing pressure difference inside the inflatable object 1 to selectively activate the operation of the valve and a linkage assembly 5 interactively sandwiched between the valve controlling assembly 3 and the pressure controlling assembly 4 to sense the operation of the pressure controlling assembly and consequently control the movement of the valve controlling assembly.

Also, from the drawing, there is provided with a first compartment 41 and a second compartment 42 both integrally formed inside the air blower assembly casing inside the housing 11. Inside the first compartment 41, a first membrane 43 is movably received so as to separate the first compartment into two separate spaces and a tube 45 or the like is provided to communicate with a space of the first compartment 41. A micro-switch 431 electrically connected to the air blower is securely mounted at the bottom face of the first membrane 43 such that when the first membrane 43 is moved downward (toward the bottom of the first compartment 41), the micro-switch 431 will be activated and the air blower is then activated. Also, when the first membrane 43 is moved upward (away from the bottom of the first compartment 41), the micro-switch 431 is deactivated. Consequently, the air blower stops. At the distal end of the tube 45, an air pressure pump 46 in communication with the tube 45 is fixedly provided. Also, inside the second compartment 42, a second membrane 44 is movably received therein to separate the second compartment 42 into two separate spaces, namely, an upper space 42A and a lower space 42B, where upper space 42A is in fluid communication with the ambient atmosphere and lower space 42B is in fluid communication with the inflatable object. To be noted is that at a free end face of the first membrane 43, the valve controlling assembly 3 is securely attached thereto such that the valve 31 at a free end of the valve controlling assembly 3 is selectively close and open when the first membrane 43 is moved inside the first compartment 41.

Figure 2A:
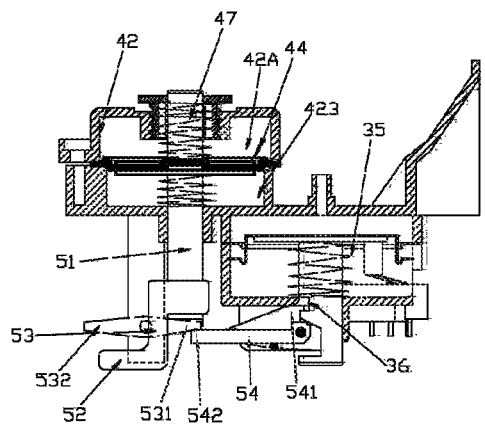
FIG. 2A is a schematic cross sectional view showing inter-relationships of elements of the controlling mechanism in inflating operation of the preferred embodiment of the present invention.
Figure 2B:
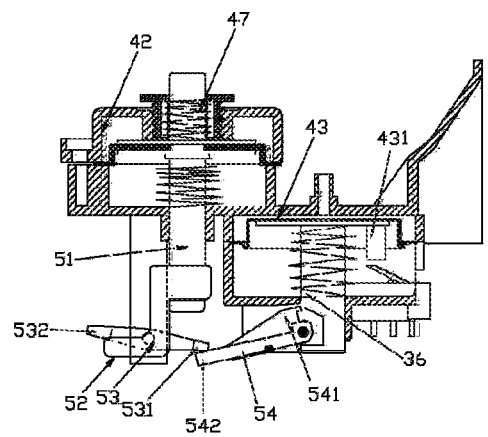
FIG. 2B is a schematic cross sectional view showing the controlling mechanism of the preferred embodiment of the present invention in a different position while still in the inflating mode.

With reference to FIGS. 2A, 2B and still using FIG. 1A for reference, the valve controlling assembly 3 includes a valve shaft 32 securely attached to the free end side of the first membrane 43 of the pressure controlling assembly 4, a collar 33 formed on an outer periphery of the valve shaft 32, a first auxiliary spring 34 mounted around the valve shaft 32 and between the collar 33 and a bottom face of the housing 11 of the inflatable object 1, a second auxiliary spring 35 mounted around the valve shaft 32 and between the first membrane 43 and a bottom face of the first compartment 41 and a recess 36 defined in a side face of the valve shaft 32. A third auxiliary spring 47 is further compressibly received in the second compartment 42. A controlling shaft 51 partially yet movably received inside the second compartment 42 of the pressure controlling assembly 4, wherein the controlling shaft 51 extends through the second membrane 44 and out of the second compartment 42, a Z shaped controlling plate 52 securely connected to a lower extended portion of the controlling shaft 51, a pivotal plate 53 pivotally connected to a side face of the housing (not shown) of the inflatable object and having a first end 531 and a second end 532 oppositely formed with the first end and directing toward a direction opposite to that of the first end 531 and a securing plate 54 pivotally connected to a side face of the housing of the inflatable object (not shown). The securing plate 54 has a first end 541 corresponding to the recess 36 of the valve shaft 32 and a second end 542 corresponding to the first end 531 of the pivotal plate 53.

With reference to FIGS. 2A and 2B and still using FIG. 1A for reference, where FIGS. 2A and 2B respectively represent the initiation and termination of the inflation to the inflatable object, when inflation to the inflatable object is required, a user may first select the setting of the switch 12 to the inflate position then squeeze the air pressure pump 46 to apply a force to the upper space in the first compartment 41. After the first membrane 43 receives the exerted force from the squeeze of the air pressure pump 46, the first membrane 43 is forced to move downward, which results in the valve shaft 32 to move in a direction the same as that of the first membrane 43. When the first membrane 43 is forced to move downward, the micro-switch 431 is thus activated and the air blower is activated to inflate the inflatable object. As described earlier, when the valve shaft 32 is forced to move in the same direction as that of the first membrane 43, the valve 31 is also forced to open the inlet of the inflatable object, which allows the air to flow into the inflatable object and the inflation process begins. In the meantime while the valve shaft 32 is moving downward, the first end 541 of the securing plate 54 extends into the recess 36 of the valve shaft 32 and locks the valve shaft 32 in position, which allows the air blower to continue functioning to inflate the inflatable object.

When the pressure inside the inflatable object gradually builds up and eventually reaches a predetermined value, the predetermined resilience force of the third auxiliary spring 47 that is mounted between the end face of the second membrane 44 and an inner top face of the second compartment 42 is overcome by the inner pressure of the inflatable object via lower space 42B, the second membrane 44 is then lifted upward by the inner pressure of the inflatable object. Consequently, the controlling shaft 51 is moved upward. When the controlling shaft 51 is moved upward, the controlling plate 52 is also moved accordingly. A second end of the controlling plate 52 engages with the second end 532 of the pivotal plate 53. After the second end 532 of the pivotal plate 53 is in contact with the second end of the controlling plate 52, the second end 532 of the pivotal plate 53 is also lifted upward and because the pivotal plate 53 is pivotally connected to the side wall of the housing 11, the first end 531 of the pivotal plate 53 is moved downward, which forces the second end 542 of the securing plate 54 to move downward as well. The downward movement of the second end 542 of the securing plate 54 allows the first end 541 of the securing plate 54 to escape the recess 36 of the valve shaft 32. After the first end 541 of the securing plate 54 escapes the recess 36, the valve shaft 32, free from any kind of restrain, moves upward and thus the valve 31 is moved to close the inlet of the inflatable object. And the upward movement of the valve shaft 32 also deactivates the micro-switch 431, which stops the function of the air blower and thus the inflation process to the inflatable object is terminated by air pressure.

Figure 3A:
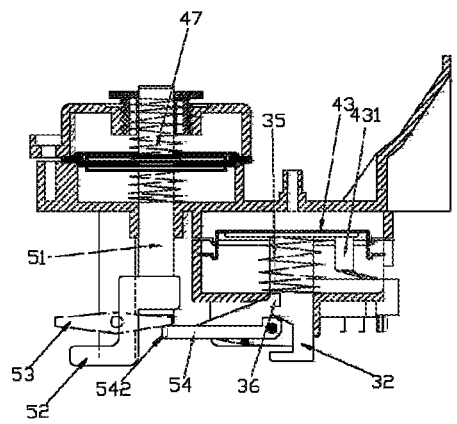
FIG. 3A is a schematic cross sectional view showing the controlling mechanism of the preferred embodiment of the present invention in a deflating mode.
Figure 3B:
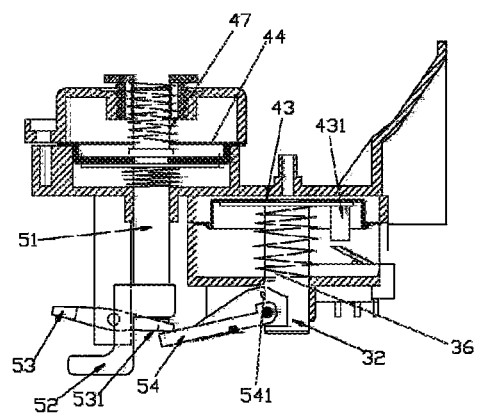
FIG. 3B is a schematic cross sectional view showing the controlling mechanism of the preferred embodiment of the present invention in a different position while still in the deflating mode.

With reference to FIGS. 3A and 3B, respectively representing the initial and termination stages of the deflation of the inflatable object, the switch 12 (in FIG. 1B) is rotated to control the air blower to rotate in a direction opposite to that of the air blower in the inflation process. After the switch 12 is rotated, the user may squeeze the air pressure pump 46 (FIG. 1A) to force the first membrane 41 to move downward to consequently move the valve shaft 32 to move accordingly. When the first membrane 43 is forced to move downward, the micro-switch 431 is thus activated and the air blower is activated to deflate the inflatable object. As described earlier, when the valve shaft 32 is forced to move in the same direction as that of the first membrane 43, the valve 31 is also forced to open the inlet of the inflatable object, which allows the air to flow out of the inflatable object and the deflation process begins. In the meantime, while the valve shaft 32 is moving downward, the first end 541 of the securing plate 54 extends into the recess 36 of the valve shaft 32 and locks the valve shaft 32 in position, which allows the air blower to continue functioning to deflate the inflatable object.

As the pressure inside the inflatable object gradually decreases, the pressure inside the upper space 42A of the second compartment 42 becomes increasingly larger than that of the lower space 42B of the second compartment 42, which is the same as the pressure inside the inflatable object, so that the second membrane 44 is forced by the pressure in the upper space of the second compartment 42 to move downward. While the controlling shaft 51 is securely attached to the bottom face of the second membrane 44, the downward movement of the second membrane 44 results in the controlling shaft 51 moving downward accordingly. Because the first end 531 is connected to the controlling plate 52, the downward movement of the controlling shaft 51 moves the controlling plate 52 to move downward, which depresses the first end 531 of the pivotal plate 53. The depressed first end 531 of the pivotal plate 53 also forces the second end of the securing plate 54 to depress as they are in contact with one another. It is then noted that after the second end 542 of the securing plate 54 is depressed, the first end 541 escapes from the recess 36 of the valve shaft 32. Thereafter, the valve shaft 32, being free of any kind of restraint, is able to move backward to its original position by the force from the first auxiliary spring 34 (FIG. 1A) as well as the second auxiliary spring 35, which allows the valve 31 to close the inlet of the inflatable object and thus terminates the deflation process of the inflatable object. It is noted that when the valve shaft 32 is moving upward, the micro-switch 431, being free from any force from the first membrane 43, is deactivated, which stops the operation of the air blower and the deflation process is terminated.

With reference to FIG. 4, a different preferred embodiment of the controlling mechanism of the present invention is shown. The controlling mechanism in this embodiment includes a valve controlling assembly 3 responsible for open/close operation of a valve, a pressure controlling assembly 4 responsible for sensing pressure difference to selectively and consequently activate the operation of the valve and a linkage assembly 5 interactively sandwiched between the valve controlling assembly 3 and the pressure controlling assembly 4 to sense the operation of the pressure controlling assembly 4 and consequently operate the movement of the valve controlling assembly 3.

With reference to FIGS. 4A and 4B, a novel valve controlling assembly 3 is introduced and composed of a knob 14 having an valve shaft 141 extending integrally downward from a bottom face of the knob 14, a controlling ring 15 integrally formed on an outer periphery of the valve shaft 141, a cylinder 16 formed at a distal end of the valve shaft 141 and having an inclined surface 161 formed at a free end face of the cylinder 16, a collar 17 formed to be movable relative to the cylinder 16 and having an abutting roller 171 formed on a top free end face of the collar 17, an upper stop rim 172 formed on an upper outer periphery of the collar 17, and a lower stop rim 173 formed on a lower outer periphery of the collar 17, a recovery spring 18 compressibly received between the upper stop rim 172 and the lower stop rim 173 and a valve 19 integrally formed with a lower free end face of the collar 17.

Because the knob 14 is integrally formed with the valve shaft 141 as well as the controlling ring 15 and the cylinder 16, turning the knob 14 results in the rotation of the cylinder 16. Again, because the inclined surface 161 of the cylinder 16 is slidably engaged with the abutting roller 171, the rotation of the cylinder 16 leads the abutting roller 171 to slide along the inclined surface 161, which results that the collar 17 moves away from the cylinder 16. The downward movement of the collar 17 will lead the valve 19 to move accordingly. And the movement of the valve 19 opens the inlet of the inflatable object (not shown).

With reference to FIGS. 5A-5E and still using FIG. 4 for reference, it is noted that a spring abutted locking post 26 is provided next to a sidewall of air pump casing inside the inflatable object and movable relative to the sidewall of the air pump casing. Corresponding to the locking post 26, a locking recess 151 is defined in a side face of the controlling ring 15. Because the locking post 26 is always abutted by the spring which has a free end movably engaged with the sidewall of the air pump casing, the locking post 26 is maintained in contact with an outer periphery of the controlling ring 15 such that when the controlling ring 15 is rotated to allow the locking recess 151 to align with the locking post 26, the locking post 26 is then forced by the resilience of the spring to enter the locking recess 151 of the controlling ring 15, which locks the controlling ring 15 in position.

Figure 5A:
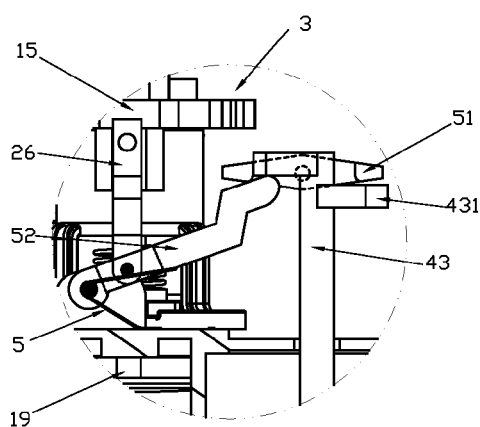
FIG. 5A is a schematic side view showing a different linkage assembly is used to interactively and operably connect to the valve controlling assembly of the embodiment of the present invention.
Figure 5B:
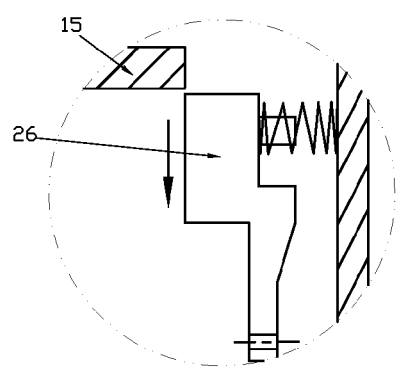
FIG. 5B is a schematic side view showing that a spring abutted locking post is provided on a side of a knob of the valve controlling assembly of the embodiment in FIG. 4.
Figure 5C:
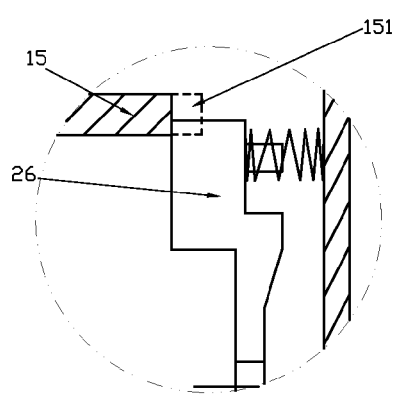
FIG. 5C is a schematic side view showing that knob is locked by the locking post.
Figure 5D:
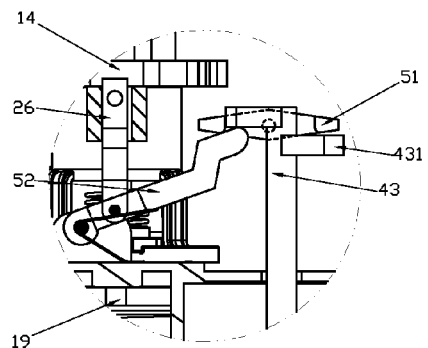
FIGS. 5D and 5E are schematic side views showing that the linkage assembly shown in FIG. 5A is operated to move the valve controlling assembly.
Figure 5E:
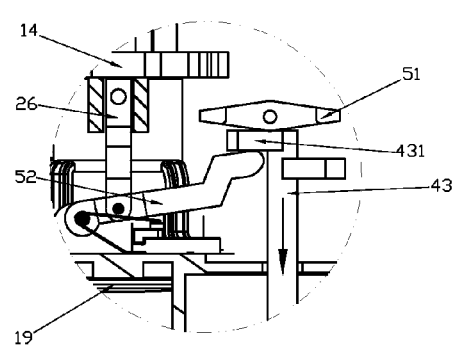
Figure 5F:
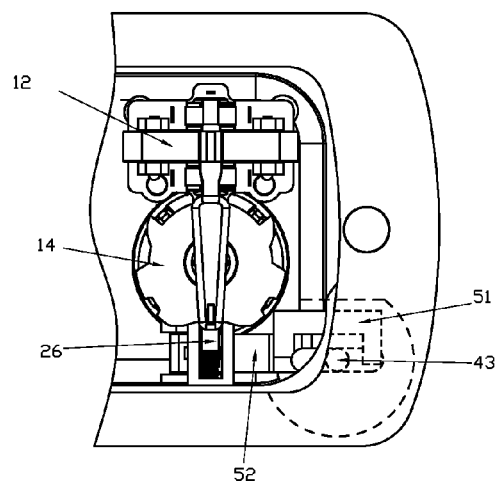
FIG. 5F is a schematic top plan view showing the relationship between the knob and the switch.

With reference first to FIG. 5F, it is noted that the knob 14 is provided with multiple (at least two) contacts respectively and selectively in contact with a switch 12 which in turn controls operation of the air blower. Therefore, when the knob 14 is rotated in a first direction, the air blower operates to inflate the inflatable object and when the knob 14 is rotated in a second direction which is opposite to that of the first direction, the air blower operates to deflate the inflatable object.

With reference to FIG. 4, it is noted that the pressure controlling assembly 4 in this embodiment includes a first compartment 41, a membrane 42 movably received in the first compartment 41, a controlling shaft 43 movably extending through the first compartment 41 as well as the membrane 42 and having a finger 431 integrally extending out of the controlling shaft 43, a first auxiliary spring 44 compressibly received between a bottom face of the first compartment 41 and a bottom face of the membrane 42 and a second auxiliary spring 45 compressibly received between a top face of the membrane 42 and a top face of the first compartment 41. It is noted that the membrane 42 received inside the first compartment 41 separates the first compartment 41 into two isolated spaces, namely the top space and the bottom space. The top space 41A is in communication with an inside of the inflatable object and the bottom space 41B is in communication with the atmosphere.

Furthermore, the linkage assembly 5 of this embodiment includes a pivotal plate 51 pivotally mounted on a side wall of the air pump and a securing plate 52 which is also pivotally mounted on a side wall of the air pump. The securing plate 52 has a first end engaged with a second end of the pivotal plate 51 and a second end pivotally connected with a free end of the locking post 26 such that when the securing plate 52 pivots, the locking post 26 is lowered and released form the locking recess 151 of the controlling ring 15. The first end of the pivotal plate 51 is engaged with the finger 431 of the controlling shaft 43 such that when the controlling shaft 43 moves upward, the first end of the pivotal plate 51 is pushed upward, and as pivotal plate 51 rotates, the second end of the pivotal plate 51 moves downward and depresses the first end of the securing plate downward.

Therefore, when the controlling mechanism of the preferred embodiment of the present invention is in operation to inflate the inflatable object, the user may first rotate the knob 14 to allow the switch 12 to activate the air blower to allow airflow to flow into the inflatable body. After the knob 14 is rotated, the switch 12 controls the activation of the air blower to inflate the inflatable object and in the meantime, the locking post 26 enters the locking recess 151 of the controlling ring 15 to lock the controlling ring 15 as well as the knob 14 in position, which allows the air pump to continue operating to inflate the inflatable object. While the knob 14 is rotated, the cylinder 16 is also rotated and because the cylinder 16 is provided with the inclined surface 161 at the free end face of the cylinder 16, the rotation of the cylinder 16 makes the abutting roller 171 of the collar 17 to roll along the inclined surface 161 and eventually, the abutting roller 171 of the collar 17 stays in the bottommost position of the inclined surface 161, which lowers the valve 19, depresses the recovery spring 18 so as to provide a recovery force to the knob 14. After the valve 19 is lowered by the lowering movement of the collar (due to the abutment of the abutting roller 171 in the bottommost position of the inclined surface 161 of the cylinder 16), the operation of the air pump forces airflow to enter the inflatable object through the inlet created by the lowering movement of the valve 19.

Still, referring to FIG. 4, because the top space is in communication with the inner pressure of the inflatable object, when the pressure inside the inflatable object gradually builds up, the gradual increasing pressure inside the inflatable object forces the membrane 42 to move downward and thus the first auxiliary spring 44 is compressed. While the membrane 42 is integrally formed with the controlling shaft 43, the downward movement of the membrane 42 results in the downward movement of the controlling shaft 43 as well. Again, because the finger 431 of the controlling shaft 43 is in contact with the second end of the pivotal plate 51, the pivotal plate 51 is pivoted when the controlling shaft 43 is moving downward. The pivotal movement of the pivotal plate 51 depresses the first end of the securing plate 52, which leads to the result that the locking post 26 is forced to move downward. As a result of the downward movement of the locking post 26, the controlling ring 15 is free from any retraining force. Thereafter, the recovery force of the recovery spring 18 forces the collar 17, the cylinder 16, the controlling ring 15 as well as the knob 14 to return to their respective original positions, which closes the inlet of the inflatable object by the upward movement of the valve 19 and deactivates the operation of the air pump. Thus the inflation process to the inflatable object is terminated.

Figure 7:
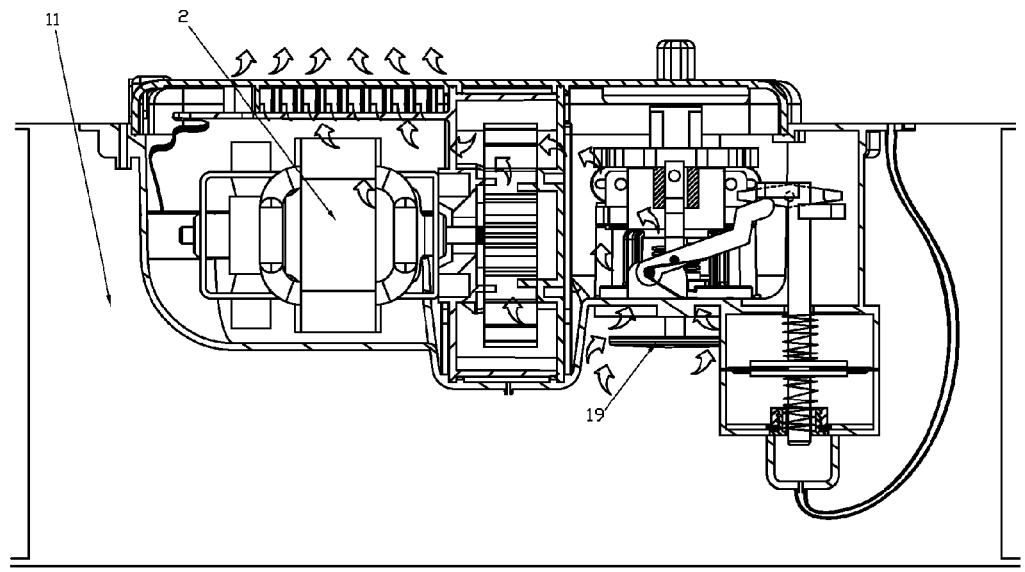
FIG. 7 is a schematic side view showing the initiation of the deflation of the inflatable object.
Figure 8:
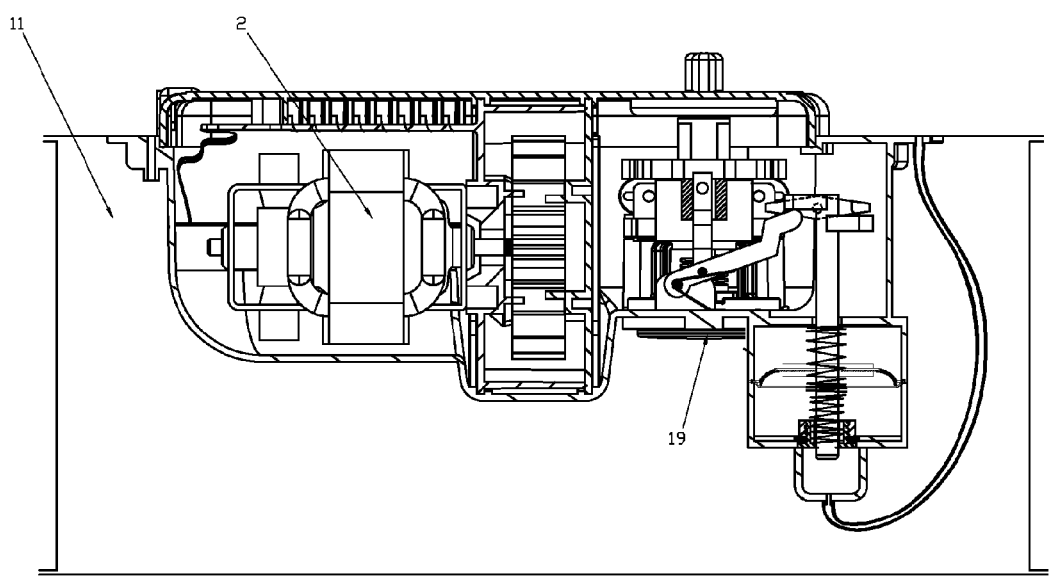
FIG. 8 is a schematic side view showing the termination of the deflation of the inflatable object.

With reference to FIGS. 7 and 8, when deflation of the inflatable object is necessary, the user may rotate the knob 14 to a different direction to contact another contact point at the switch 12, which activates the air pump to operate in a direction opposite to that while the air pump is in the inflation process. Now referring to FIGS. 5A-5E and still using FIG. 4 for reference, it is noted that a tube 46 is provided to the bottom space of the first compartment 41 to allow the bottom space to be in communication with the atmosphere such that when the air pressure inside the inflatable object is gradually decreasing, the pressure outside the inflatable object relative to the pressure inside the inflatable object is increasingly larger. Eventually, when the pressure outside the inflatable object overcomes the pressure inside the inflatable object as well as the second auxiliary spring 45, the membrane 42 is forced by the atmosphere pressure to move upward. While the membrane 42 is moving upward, the controlling shaft 43 is also moving upward, which drives the finger 431 to lift the first end of the pivotal plate 51. After first end is lifted, the second end of the pivotal plate 51 is moving downward to depress the first end of the securing plate 52. When the first end of the securing plate 52 is depressed, the locking post 26, which was previously forced to stay in the locking recess 151 of the controlling ring 15, is moved out of the locking recess 151. Thus, the knob 14 is driven by the recovery spring 18 and, because of the inclined surface 161 of the cylinder 16, is returned to its original position, which deactivates the operation of the air pump. The deflation process to the inflatable object is then terminated.

Figure 6A:
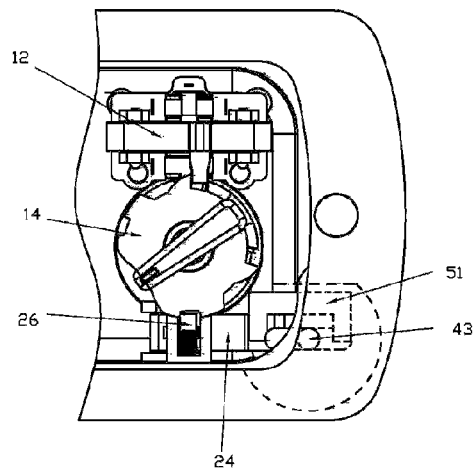
FIG. 6A is a schematic top plan view showing the knob rotated to activate the controlling mechanism of the preferred embodiment of the present invention.

With reference to FIG. 6A, it is noted that the knob 14 is freely rotated to the right or to the left to engage selectively with different contacts on the switch 12 so as to activate the air pump assembly 2 to function to inflate/deflate the inflatable object.

Figure 6B:
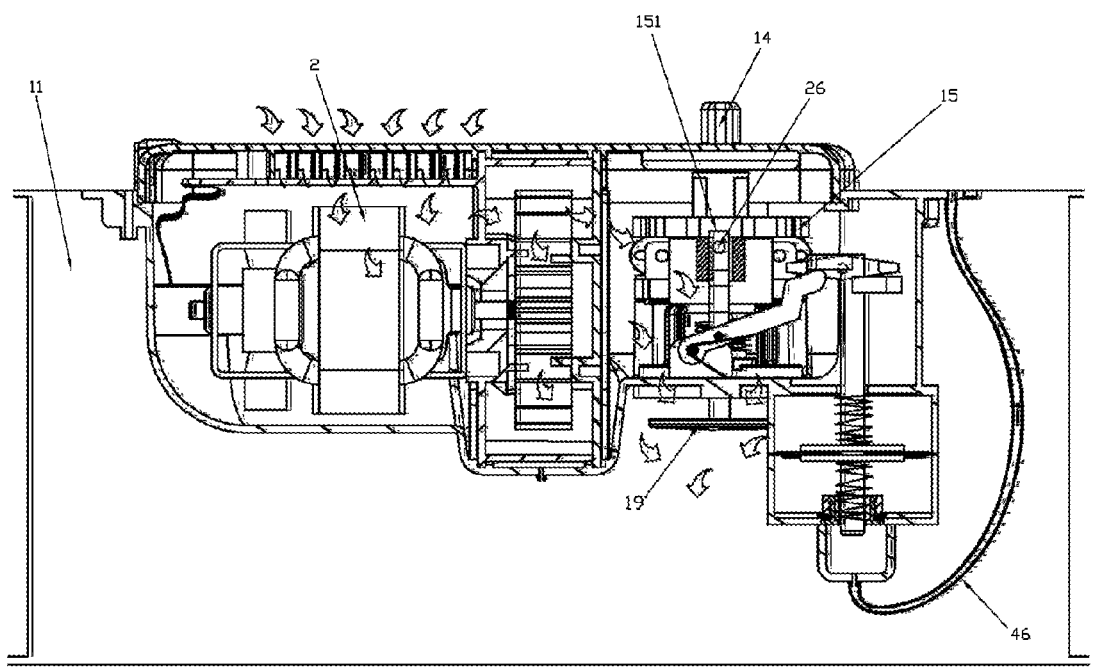
FIG. 6B is a schematic side plan view showing that after the knob is rotated, the air flows into the inflatable object via the controlling mechanism of the preferred embodiment of the present invention.

With reference to FIG. 6B, an inflating process is shown, wherein the rotation of the knob 14 allows the locking post 26 to be received in the locking recess 151 of the controlling ring 15 and the valve 19 to open the inlet of the inflatable object to allow the airflow to enter the inflatable object.

It is to be noted that although the preferred embodiment of the present invention has been described, other modifications, alterations or minor change to the structure should still be within the scope defined in the claims. As those skilled in the art will readily observe that numerous modifications and alterations of the device and method may be made while retaining the teachings of the invention.

What is claimed is:

1. A controlling mechanism for an inflatable object having an air pump selectively operable to deflate and inflate the inflatable object, the controlling mechanism comprising:
    a valve controlling assembly comprising a valve shaft and a valve formed on a distal end thereof, the valve shaft movable between a first position in which the valve is closed so as to block fluid communication between the air pump and the inflatable object and a second position in which the valve is open so as to allow fluid communication between the air pump and the inflatable object;
    a pressure controlling assembly in fluid communication with the inflatable object and comprising a controlling shaft driven to move by air pressure in the inflatable object; and
    a linkage assembly arranged to lock the valve shaft into position when the valve shaft is driven into the second position;
    wherein the pressure controlling assembly is configured such that when air pressure inside the inflatable object reaches a predetermined high pressure and the valve shaft is locked into position by the linkage assembly, movement of the controlling shaft drives the linkage assembly to release the valve shaft.

2. The controlling mechanism as claimed in claim 1, wherein the valve controlling assembly comprises a first auxiliary spring arranged such that it is compressed when the valve shaft is moved to the second position, and drives the valve shaft from the second position to the first position when the valve shaft is released by the linkage assembly.

3. The controlling mechanism as claimed in claim 1, wherein the pressure controlling assembly comprises a first compartment and a first membrane movably received in the first compartment, wherein the valve shaft is connected to the first membrane such that movement of the first membrane from a first position to a second position thereof drives the valve shaft from the first position to the second position thereof.

4. The controlling mechanism as claimed in claim 3, wherein the pressure controlling assembly comprises a second auxiliary spring mounted in the first compartment around the valve shaft arranged such that it is compressed when the first membrane is moved to the second position thereof, and drives the first membrane to drive the valve shaft from the second position to the first position thereof when the valve shaft is released by the linkage assembly.

5. The controlling mechanism as claimed in claim 3, further comprising a micro-switch mounted on a bottom of the first compartment so as to be engageable with a bottom face of the first membrane to activate the air pump, arranged such that the micro-switch is engaged and when the first membrane is in the second position thereof, and the micro-switch is non-engaged when the first membrane is moved out of the second position thereof.

6. The controlling mechanism as claimed in claim 1, wherein the linkage assembly comprises a controlling plate mounted at a distal end of the controlling shaft, a pivotal plate pivotal relative to the controlling plate and having a first end selectively engaged with a first end of the controlling plate and a second end selectively engaged with a second end of the controlling plate, and a securing plate pivotal relative to the controlling plate and having a first end selectively received in a locking recess which is defined in an outer periphery of the valve shaft and a second end engaged with the first end of the pivotal plate, wherein the controlling shaft has a neutral position, a first position and a second position, arranged such that movement of the valve shaft from the first position to the second position thereof causes the first end of the securing plate to be received in the locking recess of the valve shaft such that the valve shaft is locked into place, and driving force from air pressure in the inflatable object drives the controlling shaft to move in a first direction to the second position thereof or a second direction to the first position thereof, causing the pivotal plate to pivot such that the securing plate is pivoted such that the first end of the securing plate escapes from the locking recess to release the valve shaft.

7. The controlling mechanism as claimed in claim 6, wherein the pressure controlling assembly comprises a second compartment with the controlling shaft and a second membrane received therein, the second membrane connected to the controlling shaft and movable in the first direction and the second direction so as to accordingly drive the controlling shaft in the first direction and the second direction.

8. The controlling mechanism as claimed in claim 7, wherein the second membrane divides the second compartment into a first space and a second space, wherein a third auxiliary spring having a resilience is mounted around the controlling shaft to provide a bias against movement of the second membrane in the second direction, and wherein the second space is in fluid communication with the inflatable object and the first space is in fluid communication with ambient, arranged such that when air pressure inside the inflatable object reaches the predetermined high pressure, the resilience of the third auxiliary spring is overcome by air pressure in the second space and the second membrane moves in the second direction to drive the controlling shaft to the first position thereof.

9. The controlling mechanism in claim 8, arranged such that when air pressure inside the inflatable object reaches a predetermined low air pressure, ambient pressure in the first space drives the second membrane to move in the first direction to drive the controlling shaft to the second position thereof.

10. The controlling mechanism as claimed in claim 1, wherein the controlling shaft has a neutral position, a first position and a second position, and wherein the pressure controlling assembly comprises a second compartment with the controlling shaft and a second membrane received therein, the second membrane connected to the controlling shaft and movable in a first direction and a second direction so as to accordingly drive the controlling shaft in the first direction to the second position thereof and the second direction to the first position thereof, arranged such that when the controlling shaft is driven to the first position thereof the valve shaft is released by the linkage assembly, and when the controlling shaft is driven to the second position thereof the valve shaft is released by the linkage assembly.

11. The controlling mechanism as claimed in claim 10, wherein the second membrane divides the second compartment into a first space and a second space, wherein a third auxiliary spring having a resilience is mounted around the controlling shaft to provide a bias against movement of the second membrane in the second direction, and wherein the second space is in fluid communication with the inflatable object and the first space is in fluid communication with ambient, arranged such that when air pressure inside the inflatable object reaches the predetermined high pressure, the resilience of the third auxiliary spring is overcome by air pressure in the second space and the second membrane moves in the second direction to drive the controlling shaft to the first position thereof.

12. The controlling mechanism in claim 11, arranged such that when pressure inside the inflatable object reaches a predetermined low air pressure, ambient pressure in the first space drives the second membrane to move in the first direction to drive the controlling shaft to the second position thereof.

13. The controlling mechanism as claimed in claim 1, wherein the pressure controlling assembly being operable to drive the valve shaft into the second position thereof.

14. The controlling mechanism as claimed in claim 1, configured such that when air pressure inside the inflatable object reaches a predetermined low pressure and the valve shaft is locked into position, the controlling shaft drives the linkage assembly to release the valve shaft.

15. The controlling mechanism as claimed in claim 1, wherein the linkage assembly comprises:
   a pivotal plate adapted to be pivotally inside the air pump and having two distal ends respectively and selectively engaged with the controlling shaft to pivot; and
   a securing plate adapted to be pivotally mounted inside on the sidewall of the air pump and having a first end engaged with the valve controlling assembly to selectively lock the valve shaft in a second position and a second end engaged with one of the two distal ends of the pivotal plate such that when the pivotal plate is moved due to movement of the controlling shaft, the securing plate is pivoted to selectively release the valve shaft.

16. A controlling mechanism for an inflatable object having an air pump selectively operable to deflate and inflate the inflatable object, the controlling mechanism comprising:
   a valve controlling assembly comprising a rotatable valve shaft, a collar and a valve, the valve shaft having an inclined surface formed on a distal end thereof, the collar arranged under the valve shaft and having a roller abutting and slidably engaged with the inclined surface, the valve mounted on a distal end of the collar, arranged such that when the valve shaft is rotated from a first position to a second position, the valve is moved downward by downward movement of the abutting roller along the inclined surface so as to allow fluid communication between the air pump and the inflatable object, and when the valve shaft is oppositely rotated from the second position to the first position, the valve is moved upward by upward movement of the abutting roller along the inclined surface so as to block fluid communication between the air pump and the inflatable object;
   a locking assembly arranged to lock the valve shaft into place when the valve shaft is rotated into the second position;

a pressure controlling assembly in fluid communication with the inflatable object and comprising a controlling shaft driven to move by air pressure in the inflatable object;

a linkage assembly arranged between the pressure controlling assembly and the locking assembly; and wherein the pressure controlling assembly is configured such that when air pressure inside the inflatable object reaches a predetermined high pressure, the pressure controlling assembly drives the linkage assembly to release the valve shaft by movement of the controlling shaft to a first position, and when air pressure inside the inflatable object reaches a predetermined low pressure, the pressure controlling assembly drives the linkage assembly to release the valve shaft by movement of the controlling shaft to a second position.

17. The controlling mechanism as claimed in claim 16, further comprising a recovery spring arranged such that it is compressed when the valve shaft is rotated to the second position, and drives the valve shaft from the second position to the first position when the valve shaft is released by the linkage assembly.

18. The controlling mechanism as claimed in claim 16, wherein the pressure controlling assembly comprises a compartment in which the controlling shaft is received, a movable membrane received in the compartment and connected to the controlling shaft, the membrane dividing the compartment into a first space in fluid communication with the inflatable object and a second space in fluid communication with ambient, a first auxiliary spring mounted around the controlling shaft in the first space, and a second auxiliary spring mounted around the controlling shaft in the second space, arranged such that air pressure in the inflatable object causes movement of the membrane accordingly to drive the controlling shaft to move between a neutral position, the first position, and the second position, and the controlling shaft drives the linkage assembly to release the valve shaft when in the first or second position.

19. The controlling mechanism as claimed in claim 18, wherein the linkage assembly comprises:

a pivotal plate adapted to be pivotally mounted on a sidewall of the air pump and having two distal ends respectively and selectively engaged with the controlling shaft to pivot; and a securing plate adapted to be pivotally mounted on the sidewall of the air pump and having a first end engaged with the collar to selectively lock the valve shaft in position and a second end engaged with one of the two distal ends of the pivotal plate such that when the pivotal plate is pivoted due to movement of the controlling shaft, the securing plate is pivoted to selectively release the valve shaft.

20. The controlling mechanism as claimed in claim 19, wherein the locking assembly comprises a locking post pivotally connected to the securing plate such that when the securing plate is moved, the locking post is moved.

21. The controlling mechanism as claimed in claim 18, arranged such that when air pressure inside the inflatable object reaches the predetermined high pressure, the membrane is driven to move the controlling shaft to the second position thereof by air pressure in the first space.

22. The controlling mechanism in claim 21, arranged such that when pressure inside the inflatable object reaches the predetermined low air pressure, ambient pressure in the second space the drives the membrane to move the controlling shaft to the first position thereof.

23. The controlling mechanism as claimed in claim 16, wherein the valve controlling assembly further has a knob adapted to selectively rotate the valve shaft to open the valve and activate the pump.

24. A controlling mechanism for an inflatable object having an air pump selectively operable to deflate and inflate the inflatable object, the controlling mechanism comprising:

a valve controlling assembly comprising a rotatable valve shaft, a collar and a valve, the valve shaft having an inclined surface formed on a distal end thereof, the collar arranged under the valve shaft and having a roller abutting and slidably engaged with the inclined surface, the valve mounted on a distal end of the collar, arranged such that when the valve shaft is rotated from a first position to a second position, the valve is moved downward by downward movement of the abutting roller along the inclined surface so as to allow fluid communication between the air pump and the inflatable object, and when the valve shaft is oppositely rotated from the second position to the first position, the valve is moved upward by upward movement of the abutting roller along the inclined surface so as to block fluid communication between the air pump and the inflatable object;

a locking assembly arranged to lock the valve shaft into place when the valve shaft is rotated into the second position;

a pressure controlling assembly in fluid communication with the inflatable object;

a linkage assembly arranged between the pressure controlling assembly and the locking assembly; and wherein the pressure controlling assembly is configured such that when air pressure inside the inflatable object reaches a predetermined high pressure, the pressure controlling assembly drives the linkage assembly to release the valve shaft, and when air pressure inside the inflatable object reaches a predetermined low pressure, the pressure controlling assembly drives the linkage assembly to release the valve shaft; and wherein the pressure controlling assembly comprises a compartment, a controlling shaft received in the compartment, a movable membrane received in the compartment and connected to the controlling shaft, the membrane dividing the compartment into a first space in fluid communication with the inflatable object and a second space in fluid communication with ambient, a first auxiliary spring mounted around the controlling shaft in the first space, and a second auxiliary spring mounted around the controlling shaft in the second space, arranged such that movement of the membrane accordingly drives the controlling shaft to move between a neutral position, a first position, and a second position, and the controlling shaft drives the linkage assembly to release the valve shaft when in the first or second position.

* * * * *